(12) United States Patent
Govindaraj et al.

(10) Patent No.: US 10,621,453 B2
(45) Date of Patent: Apr. 14, 2020

(54) METHOD AND SYSTEM FOR DETERMINING RELATIONSHIP AMONG TEXT SEGMENTS IN SIGNBOARDS FOR NAVIGATING AUTONOMOUS VEHICLES

(71) Applicant: Wipro Limited, Bangalore (IN)

(72) Inventors: Balaji Govindaraj, Chennai (IN); Sujatha Jagannath, Bangalore (IN)

(73) Assignee: Wipro Limited, Bangalore (IN)

( * ) Notice: Subject to any disclaimer, the term of this patent is extended or adjusted under 35 U.S.C. 154(b) by 183 days.

(21) Appl. No.: 15/873,663

(22) Filed: Jan. 17, 2018

(65) Prior Publication Data

US 2019/0163995 A1     May 30, 2019

(30) Foreign Application Priority Data

Nov. 30, 2017 (IN) .............................. 201741043019

(51) Int. Cl.
| | |
|---|---|
| G06K 9/00 | (2006.01) |
| G06K 9/32 | (2006.01) |
| G06K 9/34 | (2006.01) |

(52) U.S. Cl.
CPC ....... *G06K 9/00818* (2013.01); *G06K 9/3258* (2013.01); *G06K 9/344* (2013.01)

(58) Field of Classification Search
None
See application file for complete search history.

(56) References Cited

U.S. PATENT DOCUMENTS

| | | | | |
|---|---|---|---|---|
| 6,175,844 B1* | 1/2001 | Stolin | ................ | G06K 9/00463 382/180 |
| 6,594,393 B1* | 7/2003 | Minka | .................. | G06K 9/6297 382/218 |
| 7,724,956 B2* | 5/2010 | Walch | .................... | G06K 9/344 382/181 |
| 8,381,095 B1* | 2/2013 | Fischer | ................. | G06F 17/218 715/234 |

(Continued)

OTHER PUBLICATIONS

"Traffic Sign Detection and Recognition"; Publisher: Wiley-IEEE Press; Book chapter is part of: Computer Vision and Imaging in Intelligent Transportation Systems; Robert P. Loce ; Raja Bala ; Mohan Trivedi; pp. 432; DOI: 10.1002/9781118971666.ch14; Copyright Year: 2017; Online ISBN: 9781118971666 (Year: 2017)*

(Continued)

*Primary Examiner* — Michelle M Entezari
(74) *Attorney, Agent, or Firm* — Pepper Hamilton LLP

(57) ABSTRACT

Disclosed herein is method and system for determining relationship among text segments in signboards for navigating autonomous vehicles. Images of signboards are captured analyzed to determine text segments in the images. Further, relationship among the identified text segments is determined based on relationship among plurality of text regions forming the text segments. Finally, information related to relationship of the text segments is provided to a navigation unit in the autonomous vehicle for facilitating navigation of the autonomous vehicle. In an embodiment, the method of present disclosure helps in eliminating prospective errors in the text identification process due to irregular arrangement of text segments in the signboards, by determining relationship among localized text segments in the images of the signboards.

12 Claims, 9 Drawing Sheets

(56) References Cited

U.S. PATENT DOCUMENTS

| | | | |
|---|---|---|---|
| 9,165,185 B2* | 10/2015 | Hamel | G06K 9/344 |
| 2008/0069456 A1 | 3/2008 | Perronnin | |
| 2011/0035379 A1 | 2/2011 | Chen et al. | |
| 2011/0106807 A1 | 5/2011 | Srihari et al. | |
| 2016/0026899 A1* | 1/2016 | Wang | G06T 7/11 |
| | | | 382/176 |
| 2017/0046580 A1* | 2/2017 | Lu | G06K 9/00818 |
| 2019/0033867 A1* | 1/2019 | Sharma | G06T 7/73 |

OTHER PUBLICATIONS

Transportation Research and Injury Prevention Program (TRIPP), Code of Practice (Part 4) Signages, 2012, 169 pages, Retrieved from the Internet: <http://smartcities.gov.in/upload/uploadfiles/files/IUT-4.pdf>.

Office of Transporting Operation, Federal Highway Administration, and U.S. Department of Transportation, Manual, Feb. 28, 2005, 15 pages, 2003 Edition, Retrieved from the Internet: <https://mutcd.fhwa.dot.gov/shse/design.pdf>.

* cited by examiner

METHOD AND SYSTEM FOR DETERMINING RELATIONSHIP AMONG TEXT SEGMENTS IN SIGNBOARDS FOR NAVIGATING AUTONOMOUS VEHICLES

This application claims the benefit of Indian Patent Application Serial No. 201741043019, filed Nov. 30, 2017, which is hereby incorporated by reference in its entirety.

FIELD

The present subject matter is related, in general, to autonomous vehicles, and more particularly, but not exclusively, to a method and system for detecting relationship among text segments in a signboard for navigating an autonomous vehicle.

BACKGROUND

For proper navigation of an autonomous vehicle, the autonomous vehicle needs to identify various text information available in surroundings of a path being traveled by the autonomous vehicle. However, performing a relative text identification among the various text information, and deriving a meaning from the available text information may be a challenging task for the autonomous vehicles. For example, during navigation, the autonomous vehicles may encounter numerous traffic signboards and other information boards, which contain various text information. In such instances, the autonomous vehicle may find it difficult to differentiate between the traffic signboards and the other information boards which in turn makes the relative text identification process a complex issue. Identifying and differentiating the traffic signboards from the other information boards helps in eliminating undue computational overheads in the text identification process, as the other information boards can be excluded from the text identification process.

The complexity of the text identification process may further increase, when the text information in the traffic boards or other information boards along the roadside comprise a combination of text information in multiple text formats or styles, such as vertical text format, horizontal text format or semi-circular text format. This is because, a text detection technique to be used for detecting and extracting the text information would vary during vehicle navigation, depending on formats or styles of each text information. Further, one of the major challenges lies in establishing a correct relationship between the identified text information and upcoming scenes and/or changes on the road.

Currently, one or more existing arts in the domain exhibit limited applicability in identification of orientation of the text information on the information boards. For example, the existing methods differentiate between text information that run left-to-right or top-to-bottom, or text information having same font, size and the like. However, the existing methods fail to identify a relationship among the text information that are in complex text formats or styles such as, semi-circular, circular, mixed font style, mixed font size and the like, and thereby result in perspective errors in the analysis.

SUMMARY

Disclosed herein is a method of determining relationship among text segments in a signboard for navigating an autonomous vehicle. The method comprises capturing, by a text segment recognition system associated with the autonomous vehicle, one or more images of the signboard using one or more image capturing devices associated with the autonomous vehicle. Upon capturing the one or more images of the signboard, one or more text regions, forming a plurality of text segments, is determined in each of the one or more images. Further, one or more text nodes are identified in each of the one or more text regions. Upon identifying the one or more text nodes, a relationship among the one or more text regions is determined by identifying a relationship among each of the one or more text nodes corresponding to the one or more text regions. Further, each of the one or more text regions are clustered based on the relationship among each of the one or more text regions, for determining the relationship among the plurality of text segments in the signboard. Finally, information related to the relationship among the plurality of text segments is provided to a navigation unit, associated with the autonomous vehicle, for facilitating navigation of the autonomous vehicle Further, the present disclosure relates to a text segment recognition system for determining relationship among text segments in a signboard for navigating an autonomous vehicle. The text segment recognition system comprises a processor and a memory. The memory is communicatively coupled to the processor and stores processor-executable instructions, which on execution, cause the processor to capture one or more images of the signboard using one or more image capturing devices associated with the autonomous vehicle. Upon capturing the one or more images of the signboard, the instructions cause the processor to determine one or more text regions, forming plurality of text segments, in each of the one or more images. Further, the instructions cause the processor to identify one or more text nodes in each of the one or more text regions. Once the one or more text nodes are identified, the instructions cause the processor to determine a relationship among the one or more text regions by identifying a relationship among each of the one or more text nodes corresponding to the one or more text regions. Further, the instructions cause the processor to cluster each of the one or more text regions based on the relationship among each of the one or more text regions to determine the relationship among the plurality of text segments in the signboard. Finally, the instructions cause the processor to provide information related to the relationship among the plurality of text segments to a navigation unit, associated with the autonomous vehicle, to facilitate navigation of the autonomous vehicle.

Furthermore, the present disclosure relates to a non-transitory computer readable medium including instructions stored thereon that when processed by at least one processor cause a text segment recognition system, associated with an autonomous vehicle, to perform operations comprising capturing one or more images of the signboard using one or more image capturing devices associated with the autonomous vehicle. Upon capturing the one or more images, the instructions cause the text segment recognition system to determine one or more text regions, forming plurality of text segments, in each of the one or more images. Further, the instructions cause the text segment recognition system to identify one or more text nodes in each of the one or more text regions. Upon identifying the one or more text nodes, the instructions cause the text segment recognition system to determine relationship among the one or more text regions by identifying relationship among each of the one or more text nodes corresponding to the one or more text regions. Thereafter, the instructions cause the text segment recognition system to cluster each of the one or more text regions based on the relationship among each of the one or more text regions for determining the relationship among the plurality of text segments in the signboard. Finally, the instructions cause the text segment recognition system to provide information related to the relationship among the plurality of text segments to a navigation unit, associated with the autonomous vehicle, for facilitating navigation of the autonomous vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
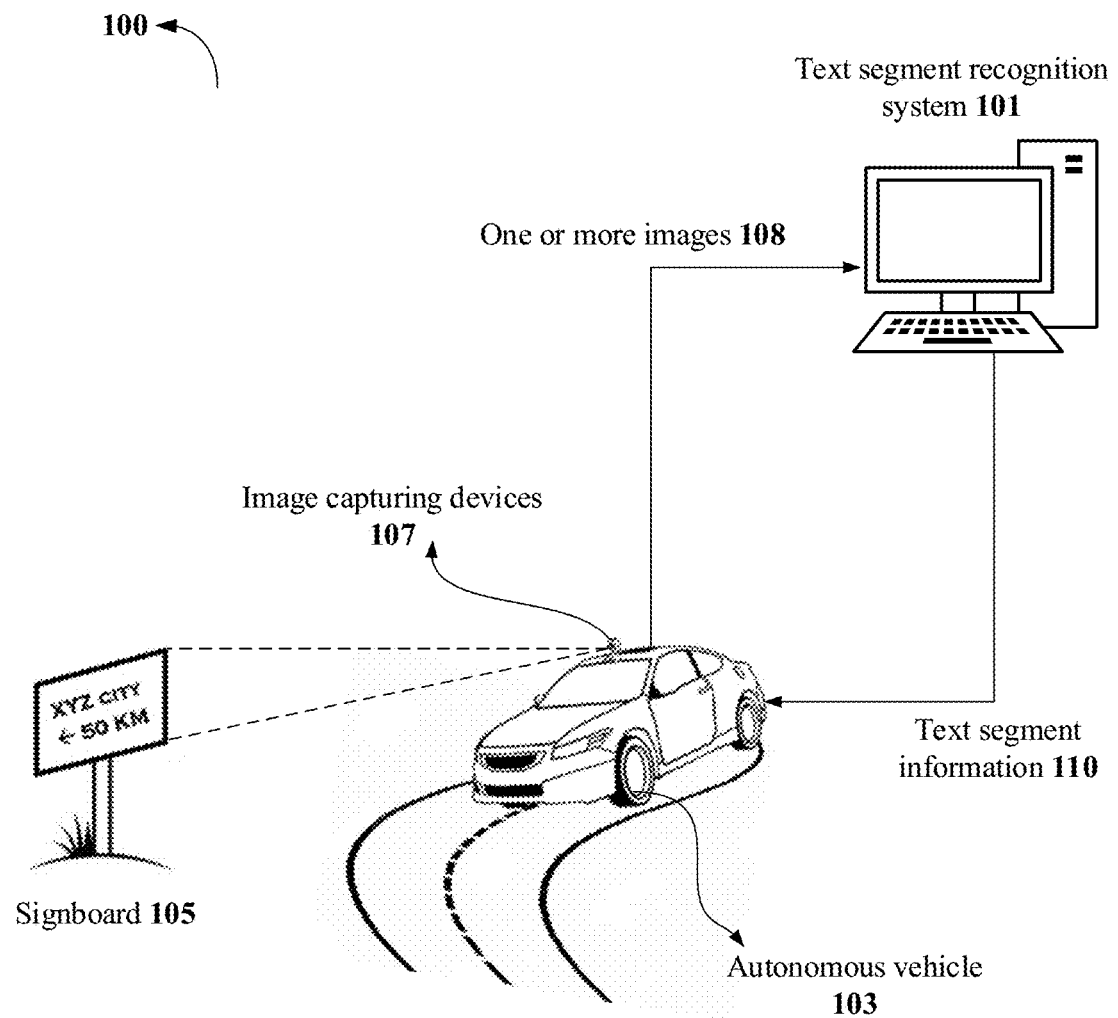
FIG. 1 illustrates an exemplary environment for determining relationship among text segments in a signboard for navigating an autonomous vehicle in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a text segment recognition system for determining relationship among text segments in a signboard for navigating an autonomous vehicle. In an embodiment, the present disclosure includes analyzing one or more images or scenes of signboards such as traffic boards, toll boards or any advertisement combined signboards, to identify one or more related text segments in the signboards. The analysis of the one or more images is performed in real-time when the autonomous vehicle is moving along the signboards, thereby providing instant navigation directions to the autonomous vehicle.

In an embodiment, the method of the present disclosure includes application of a predetermined node identification technique on each of the detected one or more images to identify one or more text nodes in the one or more images. Further, distance between each of the one or more text nodes may be determined to identify a relationship between each of the one or more text nodes. Thereafter, a relationship among each of the one or more text segments is determined based on the relationship between each of the one or more text nodes.

In an embodiment, the present disclosure provides a faster and efficient method for automated navigation of the autonomous vehicles, since the method focuses on finding relationship between the one or more text segments at image level, and does not include classifying various objects in the image. Also, the present method can be dynamically redesigned for adapting the method to analyze signboards of various types, styles and traffic guidelines of different regions, thereby effectively identifying the relationship between localized segmented text regions at the image level.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment 100 for determining relationship among text segments in a signboard 105 for navigating an autonomous vehicle 103 in accordance with some embodiments of the present disclosure.

The environment 100 includes a text segment recognition system 101, the autonomous vehicle 103, and the signboard 105 along a travel path of the autonomous vehicle 103. The signboard 105 may be an information board alongside the path of the autonomous vehicle 103, and may include, without limiting to, a traffic board, a toll board or any advertisement combined signboard 105 comprising one or more text segments. In an embodiment, the signboard 105 may be designed according to one or more design guidelines set by authorities that govern design and application of the information boards or the traffic boards across regions.

In an embodiment, the autonomous vehicle 103 may be associated with one or more image capturing devices 107 for capturing one or more images 108 of the signboard 105. As an example, the one or more image capturing devices 107 may include, without limiting to, an RGB image sensor, a monochrome image sensor or a digital camera. Further, the one or more image capturing devices 107 may be configured to capture the one or more images 108 of the signboard 105, which are within a Field of View (FOV) of the autonomous vehicle 103. In an implementation, the one or image capturing devices 107 must be placed in such a way that, the FOV must be broader to cover and capture most scenes surrounding the autonomous vehicle 103. Hence, in a preferred embodiment, the one or more image capturing devices 107 may be placed on top of the autonomous vehicle 103, and perpendicular to axis of the ground. In an embodiment, a wider FOV may be covered by placing a plurality of image capturing devices 107 at multiple predetermined locations on the autonomous vehicle 103.

In an implementation, the one or more image capturing devices 107 may be dedicated camera devices for capturing the one or more images 108. In another implementation, the one or more image capturing devices 107 may be handheld computing devices, which may be disposed in communication with one or more communication modules of the autonomous vehicle 103. Further, each of the one or more image capturing devices 107 may be polarized to eliminate reflections off the signboard 105 and capture the one or more images 108 in an acceptable image quality. As an example, a threshold resolution for the acceptable quality of the one or more images 108 may be 360 pixels.

In an embodiment, the autonomous vehicle 103 may transmit the one or more images 108 of the signboard 105, captured by the one or more image capturing devices 107, to the text segment recognition system 101 for extracting a meaningful information from the one or more images 108. In an implementation, the text segment recognition system 101 may be configured within the autonomous vehicle 103 and may communicate with the autonomous vehicle 103 using a wired communication interface and/or a wireless communication interface such as Bluetooth, Wi-Fi, mobile Wi-Fi hotspot and the like. In another implementation, the text segment recognition system 101 may be a centralized system, and may be communicatively configured with the autonomous vehicle 103 using a long-range wireless communication interface such as radio communication interface, broadcast radio communication interface, infrared communication interface, and the like.

Upon receiving the one or more images 108 from the autonomous vehicle 103, the text segment recognition system 101 may analyze each of the one or more images 108 to determine one or more text regions, forming a plurality of text segments, in the one or more images 108. Subsequently, the text segment recognition system 101 may identify one or more text nodes in each of the one or more text regions using a predetermined text marking technique such as, Convolutional Neural Network (CNN) analysis technique. Further, the text segment recognition system 101 may determine relationship among the one or more text regions by identifying the relationship among each of the one or more text nodes corresponding to the one or more text regions. As an example, the relationship among each of the one or more text nodes may be identified based on one or more predetermined techniques including line-moving technique and node-coupling technique.

In an embodiment, the text segment recognition system 101 may cluster each of the one or more text regions based on the relationship among each of the one or more text regions for determining the relationship among the plurality of text segments. For example, the one or more text regions may be identified to be related when the distance between the one or more text regions is less than or equal to a predefined threshold value say, 50 pixels. Upon determining the relationship among the plurality of text segments, the text segment recognition system 101 may extract information related to the relationship among the plurality of text segments (referred to as text segment information 110 hereinafter) and provide the information, thus extracted, to a navigation unit associated with the autonomous vehicle 103. The autonomous vehicle 103 uses the text segment information 110 received from the text segment recognition system 101 and navigates through its path. In an implementation, the navigation unit associated with the autonomous vehicle 103 may be a Global Positioning System (GPS) based navigation system. In another implementation, the navigation unit may be a navigation tool configured in a user device associated with the autonomous vehicle 103.

Figure 2A:
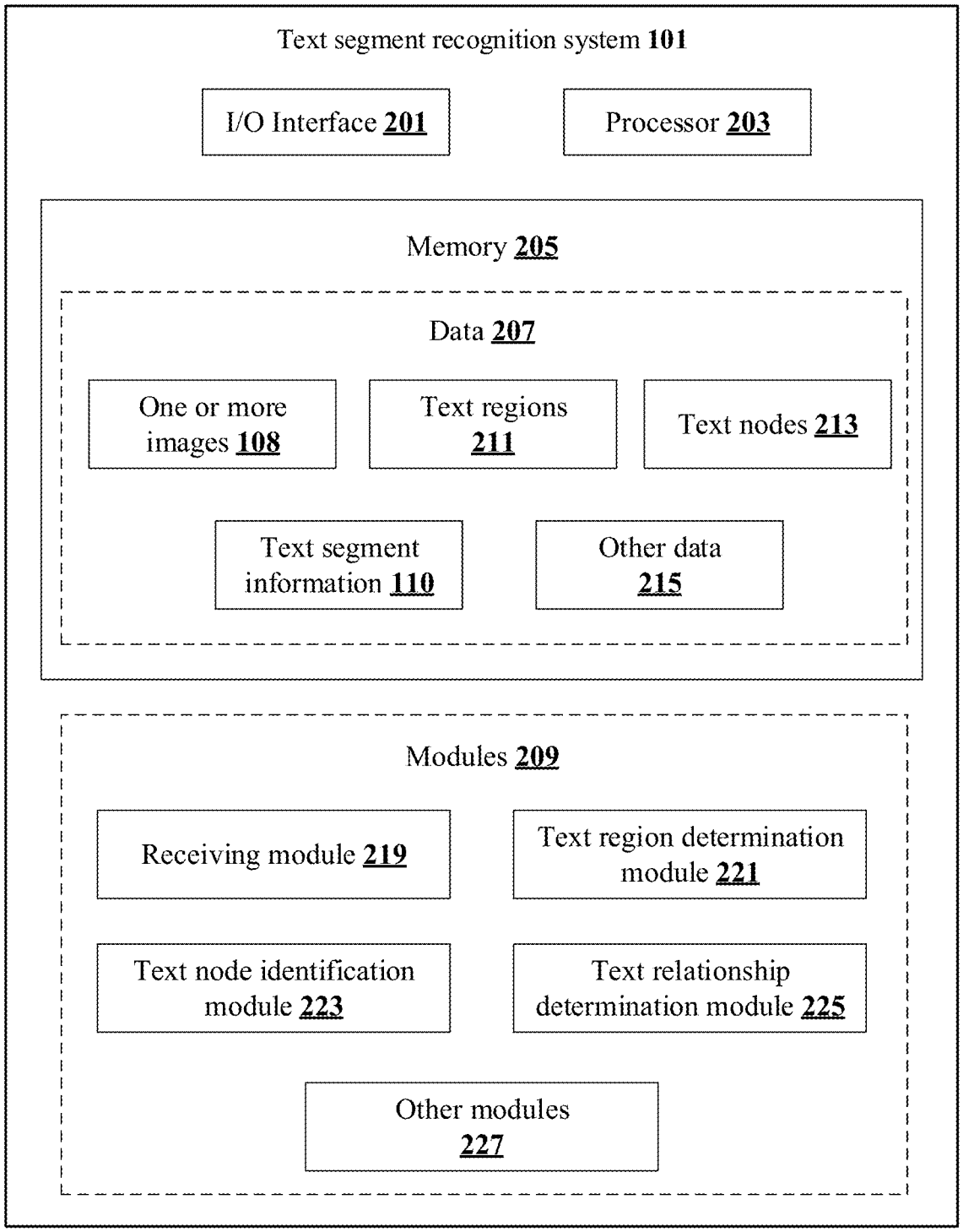
FIG. 2A shows a detailed block diagram illustrating a text segment recognition system for determining relationship among text segments in a signboard for navigating an autonomous vehicle in accordance with some embodiments of the present disclosure.

FIG. 2A shows a detailed block diagram illustrating a text segment recognition system 101 for determining relationship among text segments in a signboard 105 for navigating an autonomous vehicle 103 in accordance with some embodiments of the present disclosure.

The text segment recognition system 101 includes an I/O interface 201, a processor 203, and a memory 205. The I/O interface 201 may be configured to receive one or more images 108 of signboard 105 from one or more image capturing devices 107 associated with the autonomous vehicle 103. Further, the I/O interface 201 may be configured to transmit information related to relationship among plurality of text segments in the signboard 105 to the autonomous vehicle 103. The memory 205 may be communicatively coupled to the processor 203. The processor 203 may be configured to perform one or more functions of the text segment recognition system 101 while determining relationship among the plurality of text segments in the signboard 105.

In some implementations, the text segment recognition system 101 may include data 207 and modules 209 for performing various operations in accordance with embodiments of the present disclosure. In an embodiment, the data 207 may be stored within the memory 205 and may include, without limiting to, information related to one or more images 108, text regions 211, text nodes 213, text segment information 110, and other data 215.

In some embodiments, the data 207 may be stored within the memory 205 in the form of various data structures. Additionally, the data 207 may be organized using data models, such as relational or hierarchical data models. The other data 215 may store data, including temporary data and temporary files, generated by the modules 209 for performing the various functions of the text segment recognition system 101.

In an embodiment, the one or more images 108 of the signboard 105 are captured by the one or more image capturing devices 107 associated with autonomous vehicle 103. The one or more images 108 may be colored images, grayscale images or black-and-white images, depending on the nature of the one or more image capturing devices 107. In an embodiment, the one or more images 108 may include one or more text segments, and each of the one or more are images may be analyzed by the text segment recognition system 101 for determining relationship among each of the one or more text segments in the one or more images 108.

In an embodiment, the one or more text regions 211 are regions of texts that form plurality of text segment in the one or more images 108 of the signboard 105. The one or more text regions 211 may be determined by processing each of the one or more images 108 using one or more predetermined image processing techniques. As an example, the one or more images 108 may be analyzed using a fully Convolutional Neural Network (CNN) technique to identify one or more localized text regions 211 that belong to the plurality of text segments in the one or more images 108.

Figure 2B:
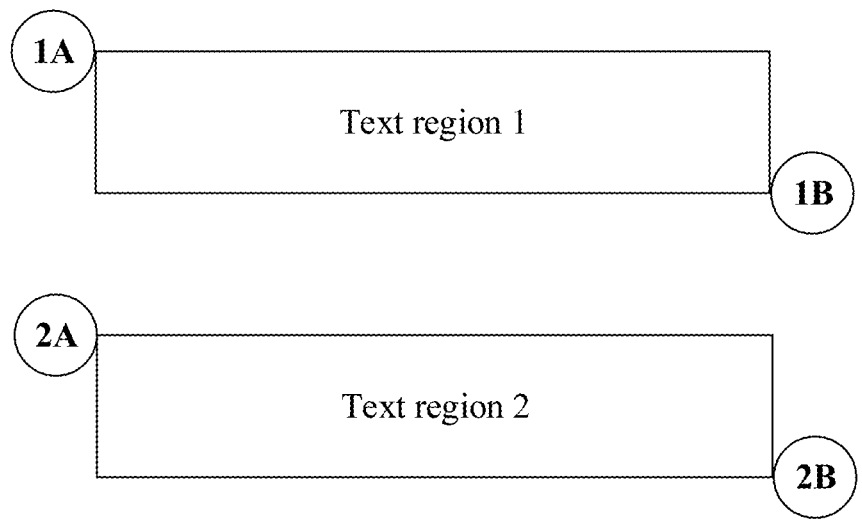
FIGS. 2B and 2C illustrate detection of text regions and identification of corresponding text nodes in accordance with some embodiments of the present disclosure.

The one or more text nodes 213 are identified and extracted from the one or more text regions 211. In an embodiment, each of the plurality of text segments present in the one or more images 108 may be represented by the one or more nodes. Further, the one or more text nodes 213 may be diagonally opposite corner points of the one or more text regions 211, such that, each of the one or more text regions 211 are represented using two text nodes 213. Upon identifying the one or more text nodes 213, a complete bi-directional graph of the one or more text nodes 213 may be generated to derive the relationship among the one or more text nodes 213 derived from one or more different text segments. FIG. 2B shows an exemplary representation of two text regions 211, namely, 'Text region 1' and 'Text region 2', along with their corresponding nodes —1A, 1B and 2A, 2B respectively.

In an embodiment, the text segment information 110 includes information related to the relationship among the plurality of text segments in the signboard 105. Consider, a signboard 105 [as shown in FIG. 1] which indicates direction and distance to a city XYZ from the current location of the autonomous vehicle 103. Here, since the direction to the city 'XYZ' is indicated using a directional arrowhead, which is a non-text element in the signboard 105, it may be excluded from the text identification process. Consequently, two text segments, namely, 'XYZ' (text segment 1), and '50 KM' (text segment 2) may be identified on the signboard 105. In this instance, the text segment information 110 corresponding to the above signboard 105 may be—'Travel 50 Kilometers to reach XYZ', using which, the navigation unit associated with the autonomous vehicle 103 can navigate the autonomous vehicle 103.

In some embodiments, the data 207 may be processed by one or more modules 209 of the text segment recognition system 101. In one implementation, the one or more modules 209 may be stored as a part of the processor 203. In another implementation, the one or more modules 209 may be communicatively coupled to the processor 203 for performing one or more functions of the text segment recognition system 101. The modules 209 may include, without limiting to, a receiving module 219, a text region determination module 221, a text node identification module 223, a text relationship determination module 225 and other modules 227.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 227 may be used to perform various miscellaneous functionalities of the text segment recognition system 101. It will be appreciated that such modules 209 may be represented as a single module or a combination of different modules.

In an embodiment, the receiving module 219 may be responsible for receiving the one or more images 108 of the signboard 105 from the one or more image capturing devices, through the one or more communication modules associated with the autonomous vehicle 103. The receiving module 219 and the one or more communication modules may communicate using any existing long-range, reliable communication interface to ensure seamless connection between the autonomous vehicle 103 and the text segment recognition system 101. Further, the receiving module 219 may receive the one or more images 108 in real-time, thereby enabling real-time analysis of the one or more images 108 of the signboard 105.

In an embodiment, the text region determination module 221 may be responsible for determining the one or more text regions 211 in the one or more images 108 of the signboard 105. The text region determination module 221 may be configured with one or more predetermined image processing techniques to process each of the one or more images 108. As an example, one of the one or more predetermined image processing techniques may be Convolution Neural Network (CNN) technique, which performs text localization and identifies regions of text in the one or more images 108. In an implementation, the text region determination module 221 may be configured with thirteen layers of Visual Geometry Group (E.g.: VGG-16), appended with nine convolutional layers and text box layers, and connected to six convolutional layers. An output of the above CNN arrangement would extract one or more localized text regions 211 from the one or more images 108. Further, the CNN may be trained with various traffic board guidelines/standard, thereby making the text region determination module 221 compatible to identify and extract localized text regions 211 according to various traffic board guidelines/standard.

In an embodiment, if there are no text regions 211 in the one or more images 108, then the text region determination module 221 may not determine any text region. Consequently, the text region determination module 221 may transmit appropriate information to the text node identification module 223, indicating the absence of text regions 211, thus making the text segment recognition system 101 to be cognitive in-terms of performance.

In an embodiment, the text node identification module 223 may be responsible for identifying the or more text nodes 213 in each of the one or more text regions 211. After the one or more text regions 211 are determined as stated in the above paragraph, the text node identification module 223 may identify one or more predetermined reference positions in each of the one or more text regions 211. As an example, the one or more predetermined reference positions in the one or more text regions 211 may be, without limiting to, a left top-most corner position and a right bottom-most corner position of each of the one or more text regions 211. Upon identifying the one or more reference positions, the text node identification module 223 may determine co-ordinates of each of the one or more predetermined reference positions, and identify the one or more text nodes 213 by tracing co-ordinate axes corresponding to the co-ordinates of each of the one or more predetermined reference positions.

As an example, referring to FIG. 2B, the nodes 1A, 1B and 2A, 2B corresponding to the 'Text region 1' and 'Text region 2' may be identified using the following steps:

A. Identifying top left-most corner position and bottom right-most corner position of each of the one or more text regions 211, such that, each of the one or more text regions 211 are represented by two reference positions.
B. Determining (x, y) co-ordinates corresponding to the one or more corner positions identified in the above step.
C. Tracing the co-ordinates, thus determined, along the x-axis and y-axis respectively, to plot the one or more corner positions on a bi-directional graph.
D. Identifying the one or more text nodes 213 as the one or more corner positions thus plotted in the bi-directional graph.

Figure 2C:
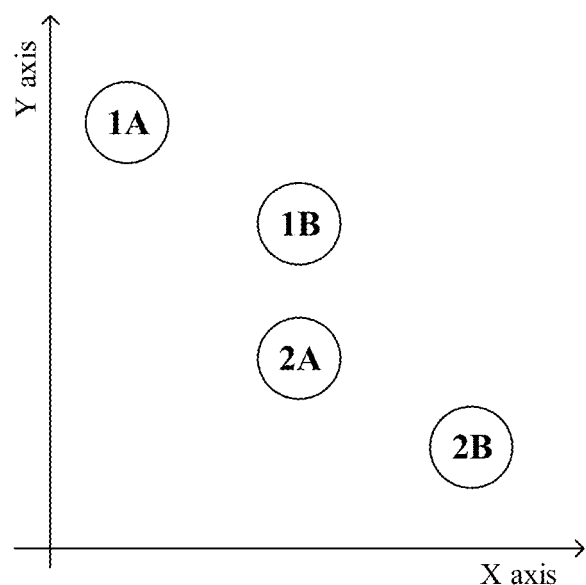
Figure 2D:
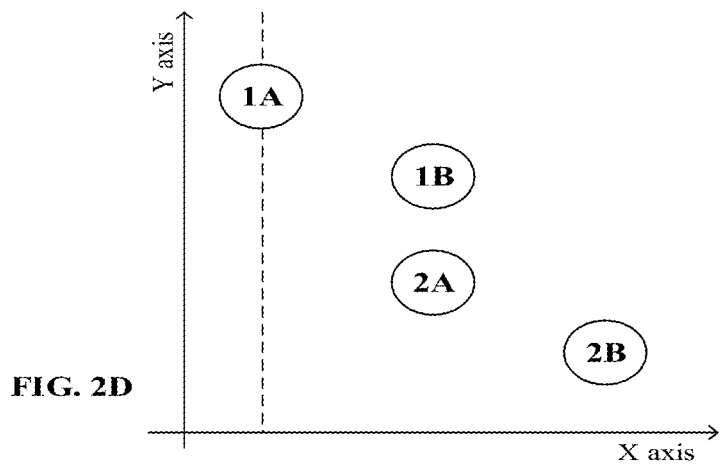
FIGS. 2D-2H illustrate a method of ordering the text nodes of text regions in accordance with some embodiments of the present disclosure.
Figure 2E:
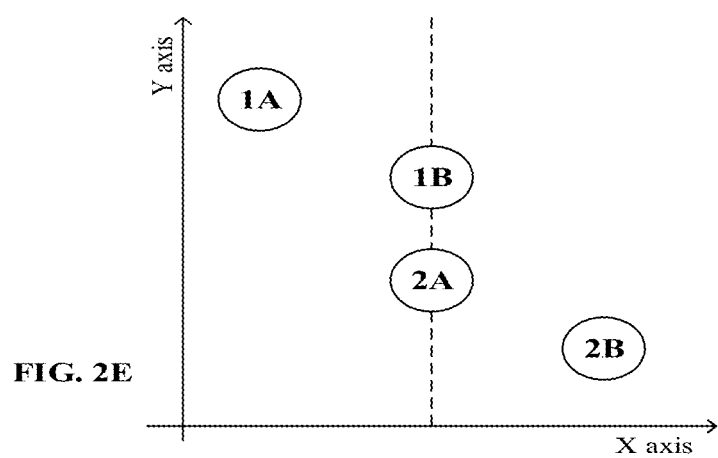

In an embodiment, upon identifying the one or more text nodes 213, each of the one or more text nodes 213 may be ordered using a predetermined technique, such as line-moving technique, for relating each of the one or more text nodes 213 to the corresponding one or more text regions 211. FIGS. 2C-2E illustrate the process of ordering each of the one or more text nodes 213 using the line-moving technique.

As shown in FIG. 2C, initially, each of the one or more text nodes 213 are plotted on a bi-directional graph based on the co-ordinates of each of the one or more text nodes 213. Subsequently, as shown in FIG. 2D, a line parallel to the Y-axis may be created and moved over each of the one or more text nodes 213 plotted on the bi-directional graph. Thereafter, the one or more text nodes 213 that touch the line may be extracted and stored in a predetermined list of nodes. In the given example, the text node 1A may be ordered first, since the text node 1A is the first node touched by the line.

Figure 2F:
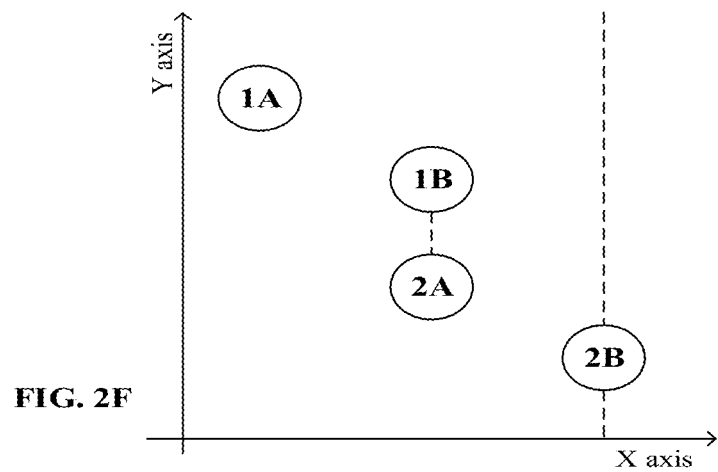

However, as shown in FIG. 2E, when plurality of the text nodes 213 (1B and 2A) appear to touch the line at the same instance, then the order of the plurality of text nodes 213 may be determined by following a top-to-bottom approach. Accordingly, in the given example, the text node 1B may be stored before the text node 2A, since position of the text node 1B is above the position of the text node 2A. Likewise, as shown in FIG. 2F, each of the one or more text nodes 213 in the bi-directional graph are ordered by moving the line until each of the one or more text nodes 213 are visited at least once by the line.

In an embodiment, the text relationship determination module 225 may be responsible for determining the relationship among the one or more text regions 211 by identifying relationship among each of the one or more text nodes 213 corresponding to the one or more text regions 211. Initially, the relationship among each of the one or more text nodes 213 may be identified by generating edges between each of the one or more text nodes 213, and then computing distance between each of the one or more text nodes 213.

In principle, each of the one or more text nodes 213 must have (N−1) edges or relations to form a complete bi-directional graph. Where, N represents the number of text nodes 213. Accordingly, in the above example, since there are 4 text nodes (N=4) identified, there must be at least 3 edges connecting the 4 text nodes 213 to form a complete bi-directional graph. Further, the distance between each of the one or more text nodes 213 (or weight of the one or more edges connecting each of the one or more text nodes 213) may be determined using the Euclidean distance equation (1) as indicated below:

$$\text{Distance } (D) \text{ between the text nodes } 213 = \sqrt{(X1-X2)^2 + (Y1-Y2)^2} \quad (1)$$

Wherein,

X1 and X2, and Y1 and Y2 represent co-ordinates of a first text node and a second text node, corresponding to a text segment, respectively.

Further, in order to determine the relationship among each of the one or more text nodes 213, the text relationship determination module 225 may generate an adjacency distance matrix 'M' based on the distance between each of the one or more text nodes 213. In an embodiment, since each of the one or more text nodes 213 are plotted on a bi-directional graph, as shown in FIG. 2G, all values indicated in the Table A below which are diagonal of the distance matrix 'M' would be zero, thereby forming only an upper triangular adjacency matrix or a right triangular adjacency matrix as shown in Table A below.

TABLE A

Figure 2G:
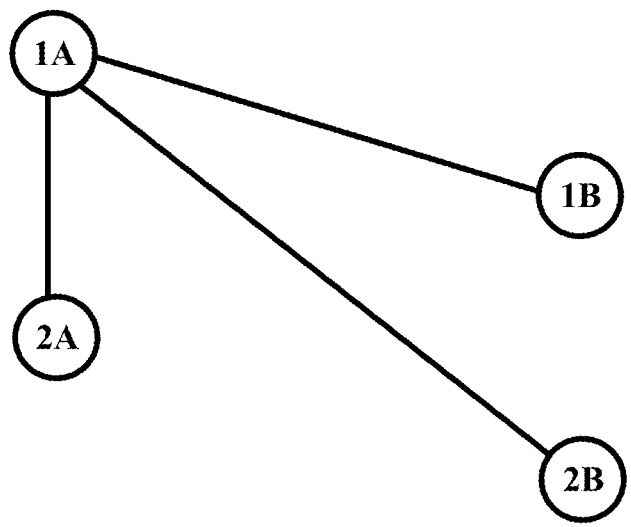

Adjacency distance matrix for the bi-directional graph of FIG. 2G

|    | 1A | 1B   | 2A   | 2B    |
|----|----|------|------|-------|
| 1A | 0  | 10.1 | 9.5  | 12.75 |
| 1B | 0  | 0    | 15.2 | 10.6  |
| 2A | 0  | 0    | 0    | 12.22 |
| 2B | 0  | 0    | 0    | 0     |

In an embodiment, upon computing the adjacency matrix as shown in Table A, the text relationship determination module 225 may traverse through the adjacency matrix, in a row-wise manner, to identify all the edges having minimum weight/distance value. In the above example, the edges that connect the text nodes 1A-2A, 1B-2B, and 2A-2B are identified as the one or more edges having minimum weight. Further, to determine the relationship among each of the one or more text nodes 213, a mean value (W) of weights of the one or more edges having minimum weightage may be calculated using Equation (2) as shown below:

$$\text{Mean weightage } (W) = \frac{\text{Weight of } [(1A - 2A) + (1B - 2B) + (2A - 2B)]}{\text{No. of edges}} \quad (2)$$

$$= (9.5 + 10.6 + 12.22)/3$$

$$= 10.77$$

Figure 2H:
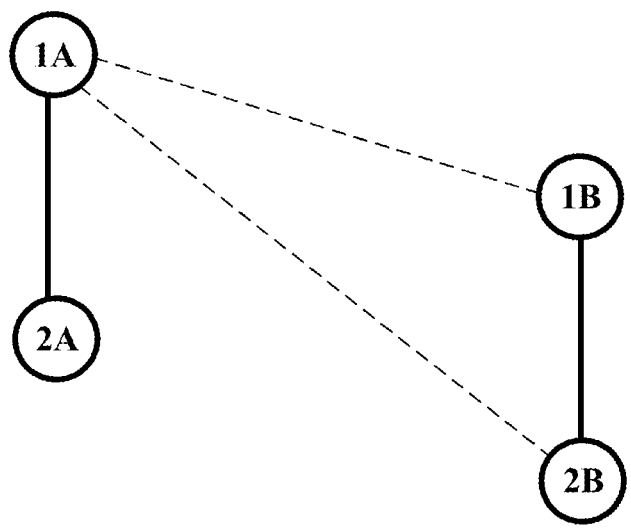

Further, the one or more edges whose weightage is less than the mean weightage (W), i.e., 10.77, are retained in the adjacency matrix (shown in Table B) and joined to identify the relationship among each of the one or more text nodes 213 as shown in FIG. 2H.

TABLE B

Adjacency distance matrix having edges with minimum weight

|    | 1A | 1B | 2A  | 2B   |
|----|----|----|-----|------|
| 1A | 0  | 0  | 9.5 | 0    |
| 1B | 0  | 0  | 0   | 10.6 |

TABLE B-continued

Adjacency distance matrix having edges with minimum weight

|    | 1A | 1B | 2A | 2B |
|----|----|----|----|----|
| 2A | 0  | 0  | 0  | 0  |
| 2B | 0  | 0  | 0  | 0  |

Finally, the relationship among each of the one or more text regions 211 may be determined based on the relationship among the one or more text nodes 213, as identified above. In the above example, the relationship among each of the one or more text regions 211 formed by the nodes 1A, 1B, 2A and 2B may be identified by joining the one or more edges among the each of the one or more text nodes 213 as shown in FIG. 2H.

Figure 3:
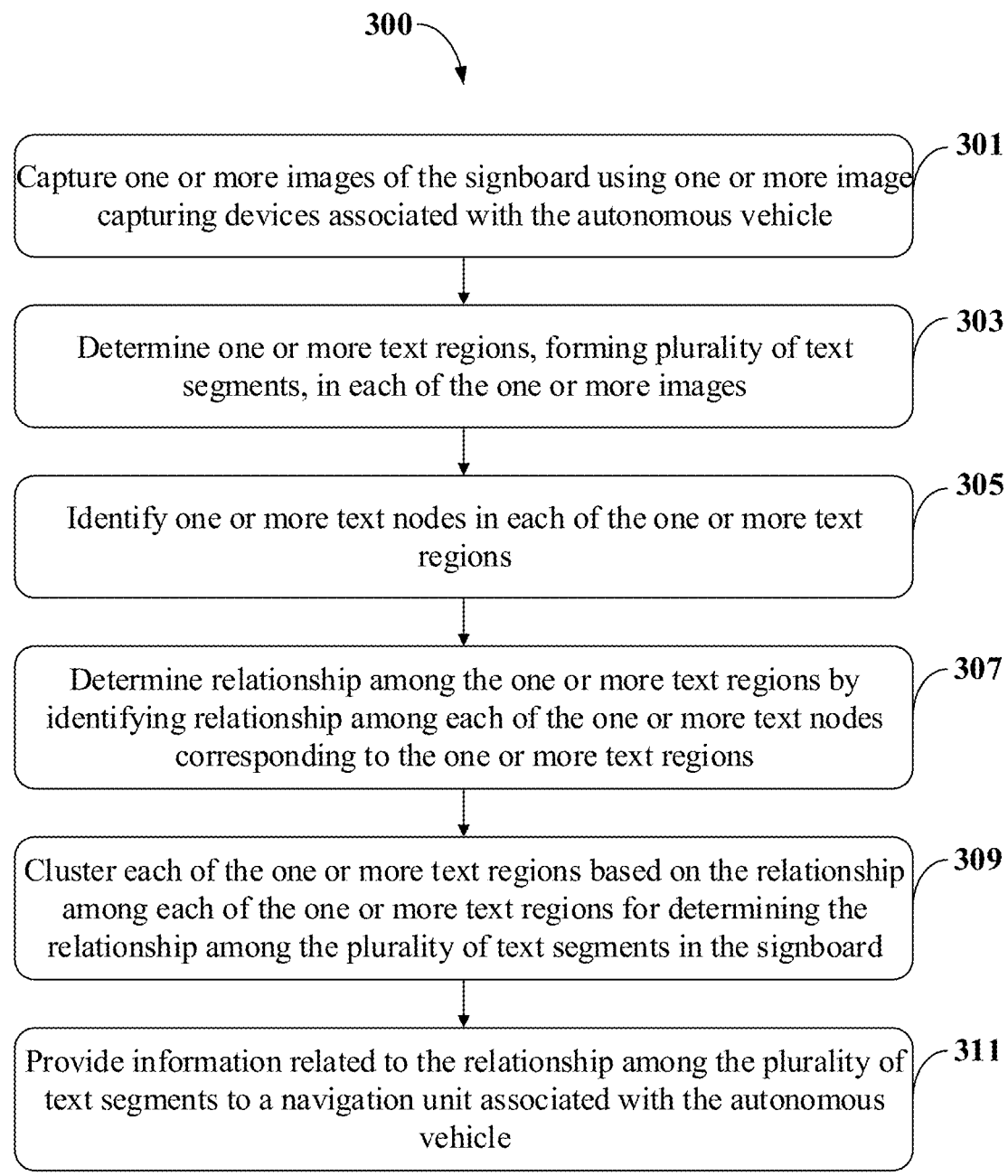
FIG. 3 shows a flowchart illustrating a method of determining relationship among text segments in a signboard for navigating an autonomous vehicle in accordance with some embodiments of the present disclosure.

FIG. 3 shows a flowchart illustrating a method of determining relationship among text segments in a signboard 105 for navigating an autonomous vehicle 103 in accordance with some embodiments of the present disclosure.

As illustrated in FIG. 3, the method 300 includes one or more blocks illustrating a method of determining relationship among text segments in a signboard 105 using a text segment recognition system 101, for example the text segment recognition system 101 of FIG. 1. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 includes capturing, by the text segment recognition system 101, one or more images 108 of the signboard 105 using one or more image capturing devices 107 associated with the autonomous vehicle 103. In an embodiment, the text segment recognition system 101 may be associated with the autonomous vehicle 103.

At block 303, the method 300 includes determining, by the text segment recognition system 101, one or more text regions 211, forming plurality of text segments, in each of the one or more images 108. In an embodiment, the one or more text regions 211 may be determined by processing each of the one or more images 108 using one or more predetermined image processing techniques.

At block 305, the method 300 includes identifying, by the text segment recognition system 101, one or more text nodes 213 in each of the one or more text regions 211. In an embodiment, identifying the one or more text nodes 213 includes detecting one or more predetermined reference positions in each of the one or more text regions 211, and determining co-ordinates of each of the one or more predetermined reference positions. Further, the one or more text nodes 213 may be identified by tracing the co-ordinate axes corresponding to the co-ordinates of each of the one or more predetermined reference positions. As an example, the one or more predetermined reference positions in the one or more text regions 211 may include, without limiting to, a left top-most corner position and a right bottom-most corner position.

At block 307, the method 300 includes determining, by the text segment recognition system 101, relationship among the one or more text regions 211 by identifying relationship among each of the one or more text nodes 213 corresponding to the one or more text regions 211. In an embodiment, determining the relationship among the one or more text regions 211 may include computing a distance matrix of each of the one or more text nodes 213 based on co-ordinates of each of the one or more text nodes 213, and determining distance between each of the one or more text nodes 213 using the distance matrix. Further, the relationship among the one or more text regions 211 may be determined by identifying the relationship among each of the one or more text nodes 213 based on the distance between each of the one or more text nodes 213.

At block 309, the method 300 includes clustering, by the text segment recognition system 101, each of the one or more text regions 211 based on the relationship among each of the one or more text regions 211 for determining the relationship among the plurality of text segments in the signboard 105. In an embodiment, the one or more text nodes 213 may be identified to be related when the distance between the one or more text nodes 213 is less than or equal to a predefined threshold value.

At block 311, the method 300 includes providing, by the text segment recognition system 101, information related to the relationship among the plurality of text segments to a navigation unit, associated with the autonomous vehicle 103, for facilitating navigation of the autonomous vehicle 103. In an embodiment, the navigation unit may use the text segment information 110, thus received from the text segment recognition system 101, and facilitate navigation of the autonomous vehicle 103.

Figure 4A:
FIGS. 4A-4D illustrate exemplary embodiments for determining relationship among text segments in accordance with some embodiments of the present disclosure.
Figure 4B:
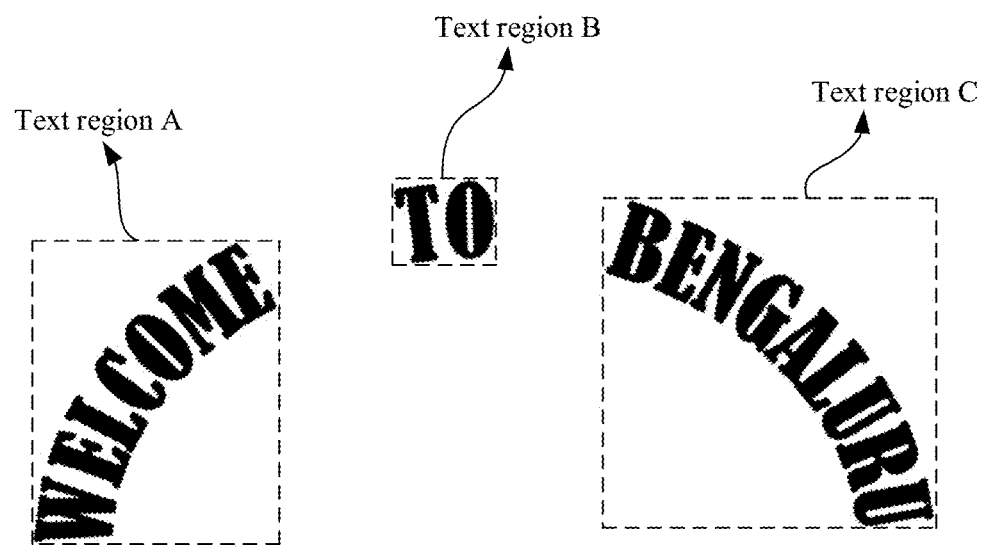

Exemplary Embodiment:

FIGS. 4A-4D show an exemplary embodiment in accordance with present disclosure. FIG. 4A is an exemplary image of a signboard 105, which includes a text segment— 'Welcome to Bengaluru'. Now, since the text segment is in a curved/semi-circular design, the text segment may be considered to form one or more text regions 211 in one or more image planes. Accordingly, the text segment may be divided into three text regions 211 namely, 'Welcome' as 'Text region A', 'To' as 'Text region B' and 'Bengaluru' as 'Text segment C' as shown in FIG. 4B.

Figure 4C:
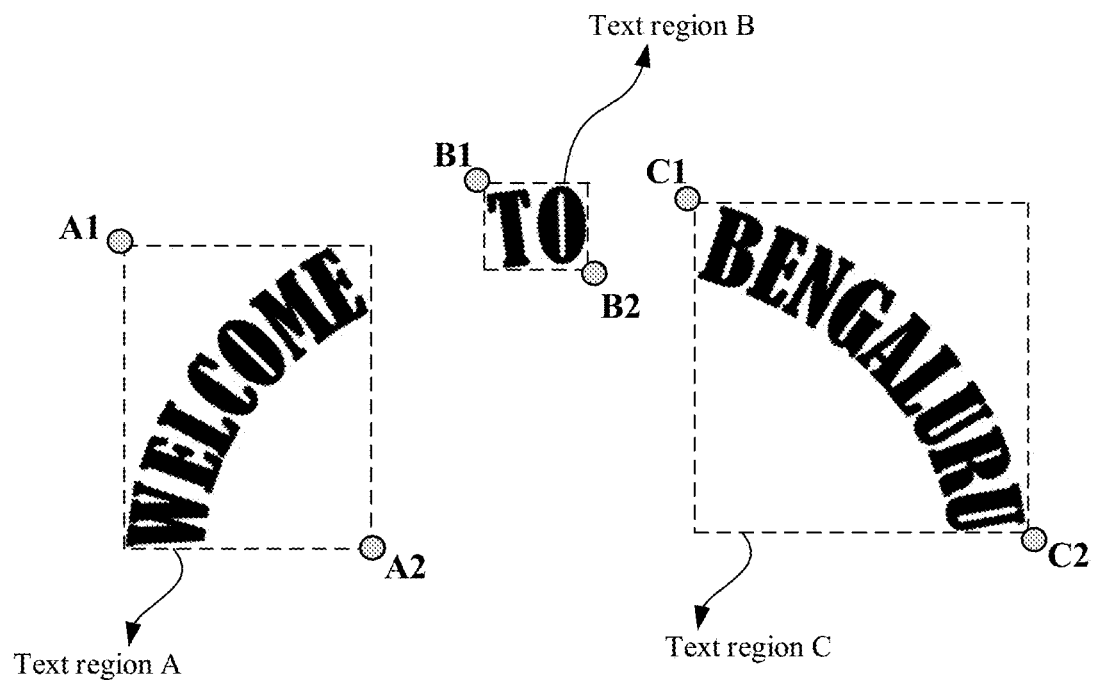

Further, one or more nodes, corresponding to each of the three text regions 211 (Text region A, Text region B and Text region C), may be determined by recognizing the predetermined reference points in each of the three text regions 211. In the instant example, the predetermined reference points to be identified in each of the three text regions 211 may be—a 'top left-most' corner and a 'bottom right-most' corner of each of the three text regions 211, such that, the 'top left-most' corner is located diagonally opposite to the 'bottom right-most' corner. Based on the above convention, text nodes A1 and A2 may be identified to be the text nodes 213 representing the 'Text region A', Similarly, the text nodes B1 and B2, and the text nodes C1 and C2 may be identified as the text nodes 213 representing the 'Text region B' and 'Text region C' respectively, as shown in FIG. 4C.

Now, the relationship among each of the one or more text nodes A1-C2, as identified in the above step may be computed by determining co-ordinates of each of the text nodes A1-C2 and then applying the equation (1) on the determined co-ordinates. In an embodiment, the distance matrix obtained by determining the distance among each of the text nodes A1-C2 is as shown in Table C below.

TABLE C

| Adjacency distance matrix of the text nodes A1-C2 | | | | | | |
|---|---|---|---|---|---|---|
| | A1 | A2 | B1 | B2 | C1 | C2 |
| A1 | 0 | 96.61 | 74.33 | 152.21 | 155.29 | 250.28 |
| A2 | 0 | 0 | 103.82 | 128.14 | 130.87 | 183.13 |
| B1 | 0 | 0 | 0 | 69.86 | 71.74 | 195.23 |
| B2 | 0 | 0 | 0 | 0 | 14.04 | 48.26 |
| C1 | 0 | 0 | 0 | 0 | 0 | 129.63 |
| C2 | 0 | 0 | 0 | 0 | 0 | 0 |

Further, the one or more edges having minimum weightage are identified, and a mean value of the weightages of the one or more edges, thus identified, is calculated using the equation (2) above. In the above example, the edges corresponding to the nodes A1-B1, A2-B1, B2-B1, B2-C1, and C1-C2 are identified as the one or more edges having minimum weightage, and the mean value of these edges may be calculated as follows:

$$\text{Mean weightage } (W) = \frac{\text{Weight of } [(A1-B1)+(A2-B1)+(B2-B1)+(B2-C1)+(C1-C2)]}{5}$$

$$= (74.33 + 103.82 + 69.86 + 14.04 + 129.63)/5$$

$$= 78.33$$

Thereafter, the one or more edges, whose weightage is more than the mean weightage of all the minimum weighted edges are eliminated from the adjacency matrix. In the above example, only the edges corresponding to the nodes A1-B1, A2-B1, B2-B1 and B2-C1 may be retained in the adjacency distance matrix, as the weightage of these edges is less than the mean weightage i.e., 78.33. As a result, the adjacency matrix may be modified as shown in Table D below.

TABLE D

| Modified adjacency matrix | | | | | | |
|---|---|---|---|---|---|---|
| | A1 | A2 | B1 | B2 | C1 | C2 |
| A1 | 0 | 0 | 74.33 | 0 | 0 | 0 |
| A2 | 0 | 0 | 0 | 0 | 0 | 0 |
| B1 | 0 | 0 | 0 | 69.86 | 0 | 0 |
| B2 | 0 | 0 | 0 | 0 | 14.04 | 0 |
| C1 | 0 | 0 | 0 | 0 | 0 | 0 |
| C2 | 0 | 0 | 0 | 0 | 0 | 0 |

Figure 4D:
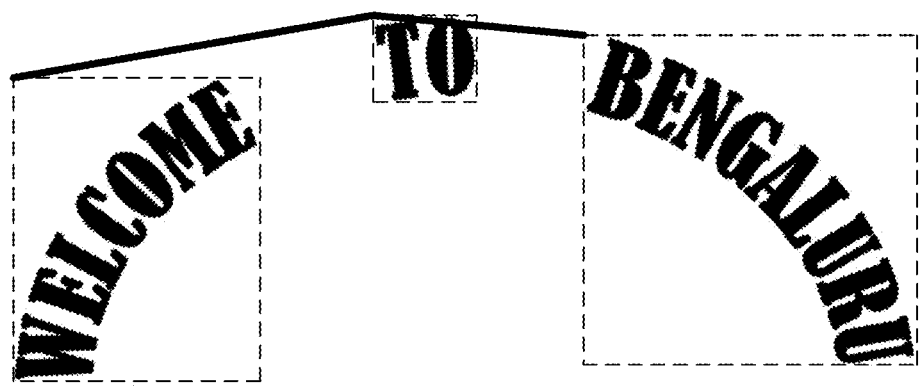

In an embodiment, the relationship among the three text regions 211 A, B and C may be determined by connecting the one or more edges retained in the modified adjacency matrix of Table D. Therefore, the one or more edges that may be connected are the edges connecting the nodes A1-B1, B1-B2 and B2-C1. Accordingly, the text nodes A1-B1-B2-C1 may be determined to be related. Therefore, the text regions 211 may be determined to be related as shown in FIG. 4D.

Finally, each of the three text regions 211, whose relationship is determined using the relationship among the one or more corresponding nodes, may be forwarded to an open source Optical Character Recognition (OCR) module for recognizing the text segment information 110 i.e. the text and/or meaning corresponding to the text segments contained in each of the three text regions 211. Following the OCR text recognition, the text segment information 110, thus recognized, may be forwarded to the navigation unit associated with the autonomous vehicle 103. The navigation unit may use the received text segment information 110 to navigate the autonomous vehicle 103.

Computer System

Figure 5:
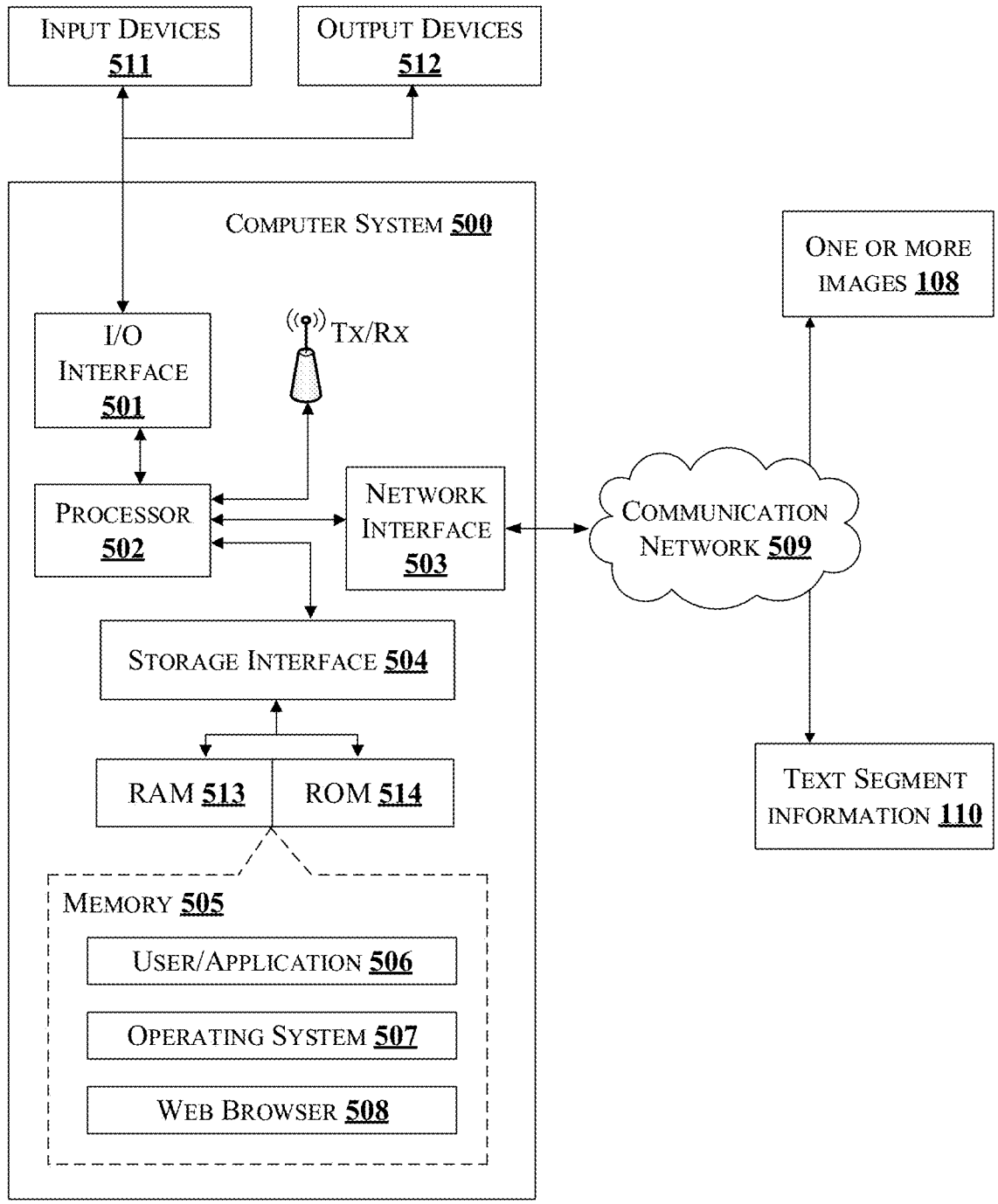
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be a text segment recognition system 101, for example, the text segment recognition system 101 of FIG. 1, which is used for determining relationship among plurality of text segments in a signboard 105 for navigating an autonomous vehicle 103. The computer system 500 may include a central processing unit ("CPU" or "processor") 502. The processor 502 may comprise at least one data processor for executing program components for executing user- or system-generated business processes. A user may include a person, a person traveling in the autonomous vehicle 103, or any other person according to embodiments of the present disclosure. The processor 502 may include specialized processing units such as integrated system (bus) controllers, memory management control units, floating point units, graphics processing units, digital signal processing units, etc.

The processor 502 may be disposed in communication with one or more input/output (I/O) devices (input device 511 and output device 512) via an I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 501, the computer system 500 may communicate with the one or more I/O devices (input device 511 and output device 512). In some implementations, the processor 502 may be disposed in communication with a communication network 509 via a network interface 503. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may communicate with one or more image capturing devices 107 associated with the autonomous vehicle 103 to receive one or more images 108 of the signboard 105. Further, the computing system 500 may use the communication network 509 for transmitting text segment information 110 to a navigation unit associated with the autonomous vehicle 103.

The communication network 509 can be implemented as one of the several types of networks, such as intranet or any such wireless network interfaces. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 e.g., RAM 513, and ROM 514, etc. as shown in FIG. 5, via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application 506, an operating system 507, a web browser 508, and the like. In some embodiments, computer system 500 may store user/application data 506, such as the data, variables, records, etc. as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure discloses a method of determining relationship among a plurality of text segments present in a signboard.

In an embodiment, the method of the present disclosure facilitates in automated navigation of autonomous vehicles, by determining relationship among plurality of text segments in the signboards, and deriving meaningful information from the relationship thus determined.

In an embodiment, the method of present disclosure helps in resolving prospective errors in the text identification process due to irregular arrangement of the text segments, by localizing the text segments for one or more images of the signboards.

In an embodiment, the method of present disclosure is capable of understanding a scene and/or one or more images of the signboard by identifying related text segments through one or more techniques that do not require prior training.

In an embodiment, the method of present disclosure identifies relationship among the one or more text segments in one or more images at the image level itself, thereby resulting in a faster/optimal method for text relationship identification.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise. A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of determining relationship among text segments in a signboard for navigating an autonomous vehicle, the method comprising:
   capturing, by a text segment recognition system associated with the autonomous vehicle, one or more images of the signboard using one or more image capturing devices associated with the autonomous vehicle;
   determining, by the text segment recognition system, one or more text regions, forming a plurality of text segments, in each of the one or more images;
   identifying, by the text segment recognition system, one or more text nodes in each of the one or more text regions, wherein the identifying comprises:
   identifying, by the text segment recognition system, one or more predetermined reference positions in each of the one or more text regions;
   determining, by the text segment recognition system, co-ordinates of each of the one or more predetermined reference positions;
   tracing, by the text segment recognition system, co-ordinate axes corresponding to the co-ordinates of each of the one or more predetermined reference positions for identifying the one or more text nodes; and
   ordering, by the text segment recognition system, the one or more text nodes to identify relationship among each of the one or more text nodes, wherein the ordering comprises ordering the one or more text nodes based on an order of contact of a line moving parallel to Y co-ordinate axes;
   determining, by the text segment recognition system, relationship among the one or more text regions by identifying relationship among each of the one or more text nodes corresponding to the one or more text regions;
   clustering, by the text segment recognition system, each of the one or more text regions based on the relationship among each of the one or more text regions for determining the relationship among the plurality of text segments in the signboard; and
   providing, by the text segment recognition system, information related to the relationship among the plurality of text segments to a navigation unit, associated with the autonomous vehicle, for facilitating navigation of the autonomous vehicle.

2. The method as claimed in claim 1, wherein the one or more text regions are determined by processing each of the one or more images using one or more predetermined image processing techniques.

3. The method as claimed in claim 1, wherein the one or more predetermined reference positions in the one or more text regions comprises a left top-most corner position and a right bottom-most corner position.

4. The method as claimed in claim 1, wherein the determining the relationship among the one or more text regions comprises:
   computing, by the text segment recognition system, a distance matrix of each of the one or more text nodes based on co-ordinates of each of the one or more text nodes;
   determining, by the text segment recognition system, distance between each of the one or more text nodes using the distance matrix; and
   identifying, by the text segment recognition system, the relationship among each of the one or more text nodes based on the distance between each of the one or more text nodes.

5. The method as claimed in claim 4, wherein the one or more text nodes are identified to be related when the distance between the one or more text nodes is less than or equal to a predefined threshold value.

6. A text segment recognition system for determining relationship among text segments in a signboard for navigating an autonomous vehicle, the text segment recognition system comprising:
   a processor; and
   a memory, communicatively coupled to the processor, wherein the memory stores processor-executable instructions, which on execution, cause the processor to:
      capture one or more images of the signboard using one or more image capturing devices associated with the autonomous vehicle;
      determine one or more text regions, forming a plurality of text segments, in each of the one or more images;
      identify one or more text nodes in each of the one or more text regions, wherein the identifying comprises:
         identifying one or more predetermined reference positions in each of the one or more text regions;
         determining co-ordinates of each of the one or more predetermined reference positions;
         tracing co-ordinate axes corresponding to the co-ordinates of each of the one or more predetermined reference positions for identifying the one or more text nodes; and
         ordering the one or more text nodes to identify relationship among each of the one or more text nodes, wherein the ordering comprises ordering the one or more text nodes based on an order of contact of a line moving parallel to Y co-ordinate axes;
      determine relationship among the one or more text regions by identifying relationship among each of the one or more text nodes corresponding to the one or more text regions;
      cluster each of the one or more text regions based on the relationship among each of the one or more text regions for determining the relationship among the plurality of text segments in the signboard; and
      provide information related to the relationship among the plurality of text segments to a navigation unit, associated with the autonomous vehicle, for facilitating navigation of the autonomous vehicle.

7. The text segment recognition system as claimed in claim 6 is associated with the autonomous vehicle.

8. The text segment recognition system as claimed in claim 6, wherein the instructions cause the processor to determine the one or more text regions by processing each of the one or more images using one or more predetermined image processing techniques.

9. The text segment recognition system as claimed in claim 6, wherein the one or more predetermined reference positions in the one or more text regions comprises a left top-most corner position and a right bottom-most corner position.

10. The text segment recognition system as claimed in claim 6, wherein to determine the relationship among the one or more text regions, the instructions cause the processor to:
   compute a distance matrix of each of the one or more text nodes based on co-ordinates of each of the one or more text nodes;
   determine distance between each of the one or more text nodes using the distance matrix; and identify the relationship among each of the one or more text nodes based on the distance between each of the one or more text nodes.

11. The text segment recognition system as claimed in claim 10, wherein the instructions cause the processor to identify the one or more text nodes as related when the distance between the one or more text nodes is less than or equal to a predefined threshold value.

12. A non-transitory computer readable medium including instructions stored thereon that when processed by at least one processor cause a text segment recognition system, associated with an autonomous vehicle, to perform operations comprising:

capturing one or more images of the signboard using one or more image capturing devices associated with the autonomous vehicle;

determining one or more text regions, forming a plurality of text segments, in each of the one or more images;

identifying one or more text nodes in each of the one or more text regions, wherein the identifying comprises:

identifying one or more predetermined reference positions in each of the one or more text regions;

determining co-ordinates of each of the one or more predetermined reference positions;

tracing co-ordinate axes corresponding to the co-ordinates of each of the one or more predetermined reference positions for identifying the one or more text nodes; and ordering the one or more text nodes to identify relationship among each of the one or more text nodes, wherein the ordering comprises ordering the one or more text nodes based on an order of contact of a line moving parallel to Y co-ordinate axes;

determining relationship among the one or more text regions by identifying relationship among each of the one or more text nodes corresponding to the one or more text regions;

clustering each of the one or more text regions based on the relationship among each of the one or more text regions for determining the relationship among the plurality of text segments in the signboard; and providing information related to the relationship among the plurality of text segments to a navigation unit, associated with the autonomous vehicle, for facilitating navigation of the autonomous vehicle.

\* \* \* \* \*